Figure 1:
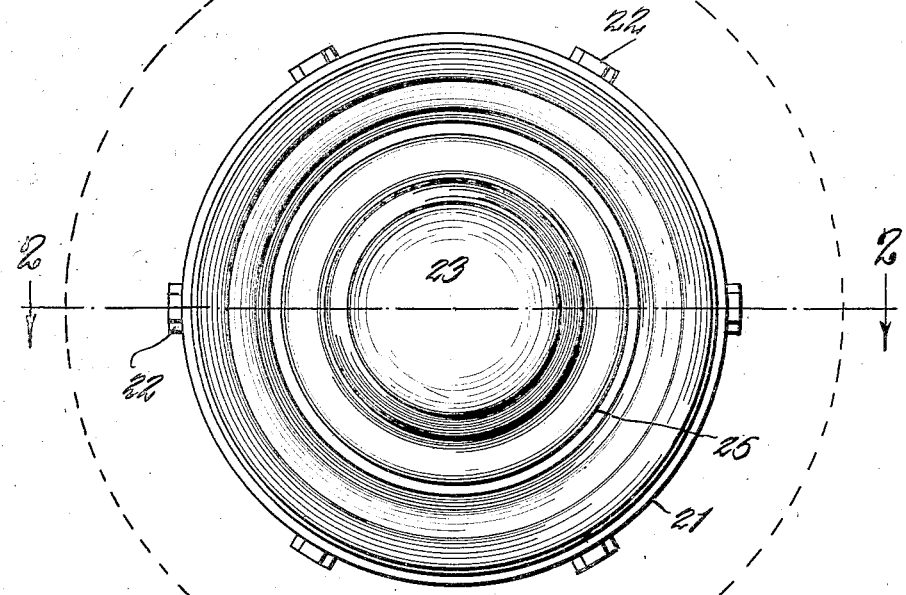

June 30, 1936.  M. T. O'NEILL  2,046,205

CUSHION WHEEL

Filed Sept. 5, 1934

Inventor
Michael T. O'Neill.

Patented June 30, 1936

2,046,205

UNITED STATES PATENT OFFICE 2,046,205

CUSHION WHEEL

Michael T. O'Neill, Cumberland, R. I.

Application September 5, 1934, Serial No. 742,784

2 Claims. (Cl. 301—6)

This invention relates to certain new and useful improvements in cushion wheels.

The primary object of the invention is to provide a cushion wheel embodying a hub and tire supporting rim with a resilient cushion plate interposed between the hub and rim to impart resiliency and cushioning properties to the wheel structure.

A further object of the invention is to provide a cushion wheel of the foregoing character which can be inexpensively manufactured and of a design to facilitate tire changing, improved roadability, and wherein the parts thereof are connected in a manner to constitute reinforcements for each other.

With the above and other objects in view that will become apparent as the nature of the invention is better understood, the same consists in the novel form, combination and arrangement of parts hereinafter more fully described, shown in the accompanying drawing and claimed.

In the drawing:—

Figure 2:
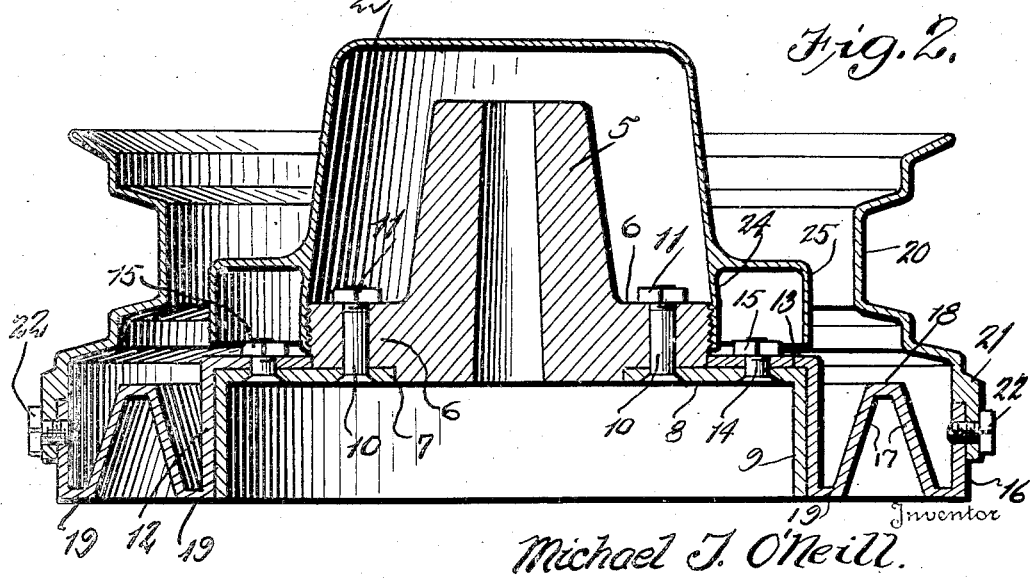

Figure 1 is a side elevational view of a cushion wheel constructed in accordance with the present invention, with the tire illustrated by dotted lines in position on the rim; and Figure 2 is a cross-sectional view taken on line 2—2 of Figure 1.

The cushion wheel comprises a hub 5 having an end flange 6 with the inner face of the flange annularly rabbeted at its outer edge as at 7 to accommodate the flush seating of the base ring 8 of the annular brake drum 9 that projects from the base ring at right angles as illustrated. The base flange 8 of the brake drum is anchored to the flange 6 of the hub by means of bolts 10 passed through the base ring and flange with the heads thereof counter-sunk in the base ring and with their threaded projecting ends at the outer side of the flange 6 receiving nuts 11 for anchoring the parts together.

The cushion wheel is of the spokeless type and in lieu of the usual spokes or disk wall there is provided an annular resilient cushion plate seated on the brake drum 9. The cushion plate embodies an annular band 12 surrounding and engaged with the brake drum and carrying an annular flange 13 thereof at one side that flatly engages the outer side of the base ring 8 of the brake drum. The base ring 8 and annular flange 13 are secured together by means of bolts 14 having their heads counter-sunk in the base ring 8 with their other ends threaded and projecting through the annular flange 13 for the reception of nuts 15. The outer peripheral side of the resilient cushion plate is in the form of an annular band 16 and said bands 12 and 16 are connected by the resilient V-shaped member comprising tapering side walls 17 having their connected ends 18 adjacent the plane of the flange 13 with their other ends connected as at 19 to the inner side edges of the annular bands 12 and 16.

The tire supporting rim 20 is of the drop center type and is provided with an integral side extension 21 that telescopes upon the adjacent free edge of the annular band 16 of the resilient cushion plate and is anchored in position thereon by means of headed radial screws 22.

A relatively large cap 23 overlies the outer end of the hub 5 and is provided with a threaded flange 24 that has threaded engagement with the annular face of the hub flange 6 and said hub cap 23 carries an angle flange 25 at its free end that overlies the bolts 14 as shown in Figure 2.

The resilient cushion plate is dimensioned to place the rim 20 in proximity to the hub, it being intended that the rim is preferably for the support of comparatively large tires of the jumbo type. It is also to be understood that the rim may be designed for the support of tires of different sizes. Resiliency in all directions is offered by the resilient cushion plate interposed between the brake drum and rim to promote increased resiliency and easy riding. The parts are connected together in a manner, whereby each part constitutes a reinforcement for the part associated therewith. A minimum of bolts is employed for securing the parts together, a series of six bolts in each instance being preferably used. It is possible to remove the tire from the rim or to remove the rim and tire from the wheel by releasing the screws 22 and the rim and tire together with the resilient cushion plate may be removed as a unit from the wheel by releasing the bolts 14. The entire weight of the wheel may be described as divided upon a three point suspension, the cushioning element comprising the resilient cushioning plate. The cushion wheel embodies four elements connected by bolts and the fifth element in the form of a hub cap that screws into position. The resilient cushion plate occupies the entire area between the brake drum and rim with the result that the cushioning of the wheel is easily distributed when idle or in service.

From the above detailed description of the invention, it is believed that the construction and operation thereof will at once be apparent and while there is herein shown and described the preferred embodiment of the invention, it is nevertheless to be understood that minor changes may be made therein without departing from the spirit and scope of the invention as claimed.

I claim:—

1. In a cushion wheel, a hub, a brake drum projecting from the inner end thereof, a rim having a mounting portion surrounding the brake drum, and a tire supporting portion projecting laterally thereof and surrounding the hub and being of smaller diameter than the mounting portion and a resilient cushion plate interposed between the brake drum and rim and including an annular member of substantially V-shape in cross-section and annular concentric bands respectively at the inner and outer sides of the V-shaped part connected to the brake drum and rim.

2. In a cushion wheel, a hub, a brake drum projecting from the inner end thereof, a rim having a mounting portion surrounding the brake drum, and a tire supporting portion projecting laterally thereof and surrounding the hub and being of smaller diameter than the mounting portion and a resilient cushion plate interposed between the brake drum and rim and including an annular member of substantially V-shape in cross-section and annular concentric bands respectively at the inner and outer sides of the V-shaped part connected to the brake drum and rim, and an angle flange carried by the inner concentric band engaged with a side of the brake drum.

MICHAEL T. O'NEILL.